Patented Aug. 31, 1943

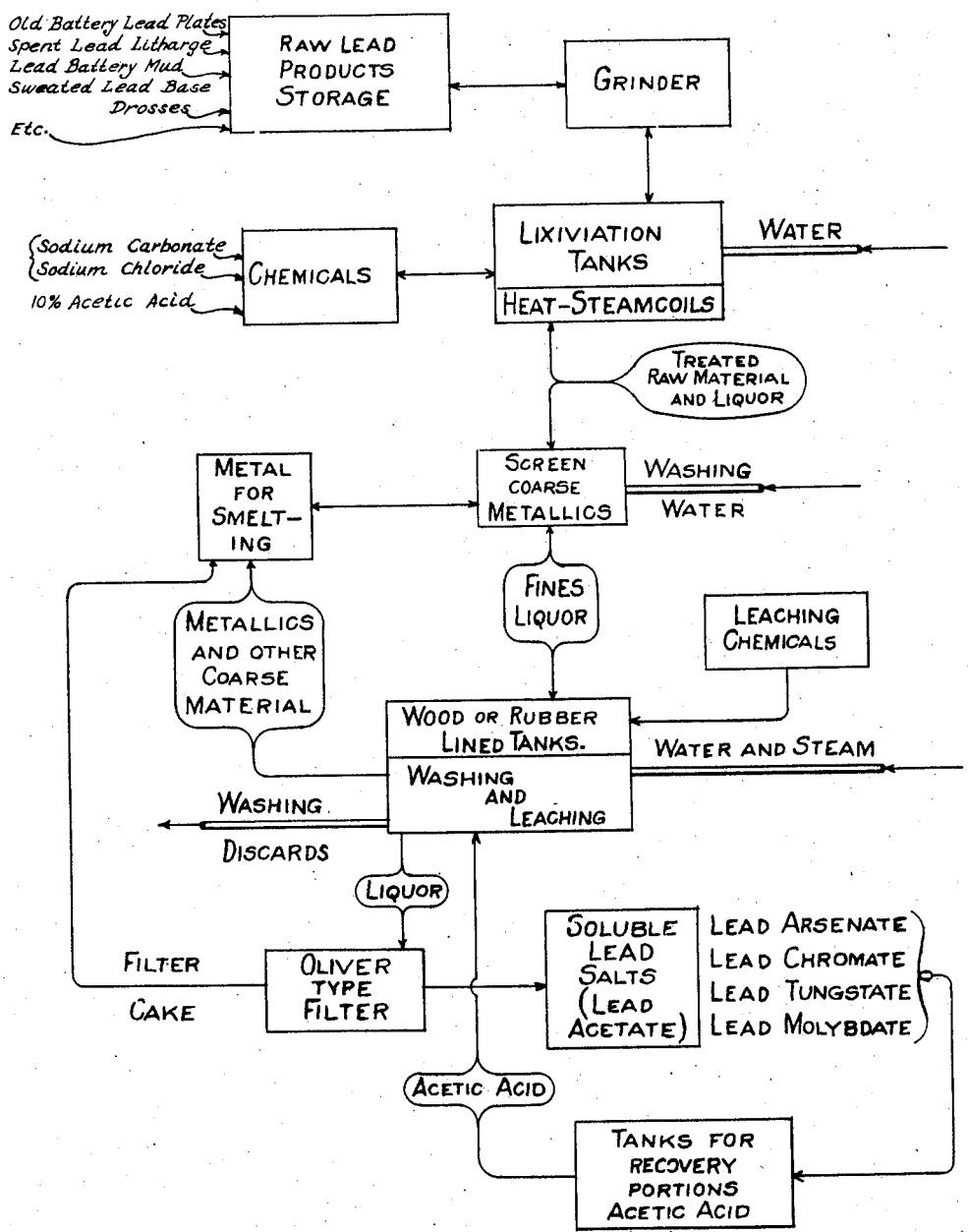

2,328,089

UNITED STATES PATENT OFFICE 2,328,089

RECOVERY OF SOLUBLE LEAD SALTS FROM INSOLUBLE LEAD COMPOUNDS

John J. Mulligan, East Chicago, Ind., assignor to Lillian R. Birkenstein

Application September 14, 1940, Serial No. 356,885

9 Claims. (Cl. 260—436)

This invention relates to a process of recovering soluble lead salts from insoluble lead compounds.

An object of this invention is to provide a simple and effective process for producing lead salts suitable for the manufacture of the arsenate, chromate, molybdate, tungstate, acetate, and other compounds of lead from insoluble and impure lead bearing materials and compounds such as lead sulphate, lead oxide, and lead peroxide. At the same time, impurities of antimony and its salts, sulphuric acid and barium sulphate are separated from the lead salts.

A further object is to provide a simple method for treating lead bearing materials, such as lead sulphate, spent litharge, sweated lead base drosses, old battery lead plates, lead battery mud and resulting drosses from liquated battery lead plates and lead battery mud or sediment, by neutralizing portions and converting portions of the raw materials with the aid of chemicals so as to produce a suitable pure mixture of lead compounds from which is made a commercial solution of various strengths of soluble lead salts and from these salts the many and varied commercial lead products, such as lead arsenate, lead chromate, lead molybdate, lead tungstate, etc.

The invention is described, in a preferred embodiment, by the accompanying drawing, in which is shown a flow sheet illustrating the steps of the process, the flow sheet being schematic in character.

In a broad or general way, the process comprises two steps of treatment for the insoluble lead materials.

In the first step, the raw materials are placed in a suitable vessel together with a water solution of a carbonate or hydroxide of the alkali metal group in such an amount as will neutralize and convert the lead compounds present in the raw materials, particularly such compounds as lead sulphate, to a compound of lead, which may be readily converted by the second step of the treatment to the form of soluble lead salts.

In addition to the carbonates and hydroxides of the alkali metal group, ammonium carbonate or hydroxide may be used to neutralize and convert the insoluble lead compounds in the first step of the process.

If desired, a suitable mixture of any of these carbonates or hydroxides may be used. For example, such compounds as sodium carbonate, potassium carbonate, sodium hydroxide and potassium hydroxide may be used.

After this treatment, the solution may be removed from the insoluble residue, which is then ready for the second step of the treatment.

The second step in general comprises the treatment of the residue from the preceding step with a suitable quantity of formic acid or with acetic acid in the form of a dilute solution. A 10% solution of acetic acid is satisfactory for this purpose. If an acetic acid solution is used, it is preferably combined with other suitable chemicals.

The chemical or chemicals which may be used with acetic acid include any substance which will act as a reducing agent with respect to the lead peroxide. All reducing agents will effect the reduction of lead peroxide to lead oxide, but some substances are not as satisfactory as others, since some reducing agents cause other reactions which are not desired. Among the preferred reagents which will cause reduction are formic acid, sodium nitrite, potassium nitrite and other alkali metal and alkaline earth salts of nitrous acid, and hydrogen peroxide, and alkali metal and alkaline earth peroxides.

Hydrogen chloride (hydrochloric acid) is also a suitable reducing agent, but should be used in a quantity sufficiently small to effect the reduction without causing the formation of appreciable quantities of lead chloride, which is difficulty soluble in water. Instead of hydrochloric acid, sodium chloride, chlorides of potassium, lithium, magnesium, and calcium, as well as other water soluble chlorides may be used with the acetic acid. The effect is substantially the same, since the chloride salts in the presence of acetic acid form hydrochloric acid. The quantity of sodium chloride used should be limited the same as that of hydrochloric acid.

These chemicals are referred to herein as reducing agents because their action with respect to lead peroxide is that of reduction. In other words, any of these chemicals will cause lead peroxide to be reduced to lead oxide.

The second step of the treatment serves to convert the insoluble lead compounds to soluble lead salts, such as the acetate. When formic acid is used alone, the final product is lead formate.

The term "solubility" as used herein refers to solubility in water or water solutions.

As a specific illustration of the process, and assuming that lead battery plates are to be used as the raw material, I first remove the lugs and then grind the entire battery grids. The ground material is then treated in a hot solution (160° F. or higher) of sodium carbonate with a small percentage of sodium chloride. I prefer to have about a 10% solution of soda ash for 100 pounds of lead battery plates (the sodium carbonate being about 7 pounds and the sodium chloride being about ½ pound).

The mixture of the ground plate material and the soda solution is vigorously agitated by stirring while the solution is kept at from 160° to 212° F. with steam or other means. After about one-half hour of such stirring of the whole mixture, the mixture is run over a screen to remove large metal pieces, then the balance with the liquor is transferred to the washing and leaching tank.

Washing of the mixture is accomplished by decantation of the liquor from the insoluble residue. After washing, the residue is leached with 10% acetic acid containing sufficient sodium nitrite to make the lead peroxide ($PbO_2$) soluble. Instead of sodium nitrite, sodium chloride or formic acid or hydrogen peroxide or other suitable material may be used.

The resulting lead acetate solution is then run through an Oliver type filter to insure the elimination of sediment or insolubles that might be left in the solution. The dissolving of the lead compound may be hastened by heating, a temperature above 100° F. being preferred.

The clear filtered lead acetate solution is now ready for the addition of the necessary chemicals for making lead arsenate, lead chromate, lead molybdate, lead tungstate, etc. The step of adding such chemicals to the lead acetate solution is well known in the industry, and no further description is believed to be necessary.

The residue left in the leaching tank is removed at intervals, as necessary, and contains metal and leached washed wood pulp, rubber, etc. (remaining from separators) that might have been present in the original battery lead plate.

The metal is then taken out of the tank and is melted into commercial antimonial lead containing usually from 90% to 93% lead, depending on the proportion of metallic lead contained in the original grids treated. At the same time, as indicated in the flow sheet, the metallics recovered from the screens and filter cake are returned for smelting.

The recovery of the acetic acid portions, as indicated in the flow sheet, is well known in the art and is, therefore, not described in detail, it being understood that the recovered acid is returned as indicated in the drawing to the washing and leaching tank.

The mechanism of all of the reactions which take place in the steps of the treatment described herein is not thoroughly understood, and accordingly no theory is advanced therefor. However, it has been shown that by following this treatment, substantially all of the insoluble lead compounds, and particularly lead sulphate, lead oxide, and lead peroxide, are converted to soluble compounds such as the acetate.

This application is a continuation in part of my copending application, Serial No. 166,437, filed September 29, 1937, for Recovery of soluble lead salts from impure lead compounds.

I claim:

1. In a process for treating insoluble lead compounds containing lead peroxide, the step of treating the compounds with a solution of acetic acid and a reagent causing reduction.

2. In a process for treating insoluble lead compounds containing lead peroxide, the step of treating the compounds with a solution of formic acid.

3. In a process for treating insoluble lead compounds containing lead peroxide, the step of treating the compounds with a solution containing a mixture of acetic acid and formic acid.

4. A process for treating insoluble lead compounds containing lead sulphate and oxides of lead to produce soluble lead salts, comprising treating the compounds by lixiviation with a solution of a compound of the group consisting of ammonium and alkali metal carbonates and hydroxides, removing the solution, and treating the residue with a solution of acetic acid and a reagent causing reduction.

5. A process for treating insoluble lead compounds containing lead sulphate and oxides of lead to produce soluble lead salts, comprising treating the compounds by lixiviation with a solution of a compound of the group consisting of ammonium and alkali metal carbonates and hydroxides, removing the solution, and treating the residue with a solution of formic acid.

6. A process for treating insoluble lead compounds containing lead sulphate and oxides of lead to produce soluble lead salts, comprising treating the compounds by lixiviation with a solution of a compound of the group consisting of ammonium and alkali metal carbonates and hydroxides, removing the solution, and treating the residue with a solution of formic acid and acetic acid.

7. A process for treating insoluble lead compounds containing lead sulphate and oxides of lead to produce soluble lead salts, comprising treating the compounds by lixiviation with a solution of a compound of the group consisting of ammonium and alkali metal carbonates and hydroxides, removing the solution, and treating the residue with a solution including acetic acid and hydrochloric acid.

8. A process for treating insoluble lead compounds containing lead sulphate and oxides of lead to produce soluble lead salts, comprising treating the compounds by lixiviation with a solution of a compound of the group consisting of ammonium and alkali metal carbonates and hydroxides, removing the solution, and treating the residue with a solution of acetic acid and hydrogen peroxide.

9. A process of the character described for recovering from scrap lead, battery plates, lead sulphate, spent lead litharge, lead battery mud, and lead drosses substantially all metallic fines as soluble lead salts, comprising grinding the material to reduce it to finely divided form, subjecting the same to lixiviation in a hot solution of an alkali metal carbonate, removing the solution, washing the insoluble residue with water, and then treating the residue with a solution of acetic acid and formic acid.

JOHN J. MULLIGAN.